United States Patent

Weston

[15] 3,677,106
[45] July 18, 1972

[54] STEERING COLUMNS
[72] Inventor: James Henry Weston, London, England
[73] Assignee: International Standard Electric Corporation, New York, N.Y.
[22] Filed: Oct. 21, 1970
[21] Appl. No.: 82,646

[30] Foreign Application Priority Data
Nov. 13, 1969 Great Britain......................55,593/69

[52] U.S. Cl. ..............................................................74/492
[51] Int. Cl. .........................................................B62d 1/18
[58] Field of Search ............................................74/492, 493

[56] References Cited

UNITED STATES PATENTS 3,457,800 7/1969 Toshida et al. ..........................74/492
3,492,888 2/1970 Nishimura et al.........................74/492

Primary Examiner—Milton Kaufman
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A collapsible energy-absorbing steering column for a motor vehicle including a torque-transmitting assembly, connected between the vehicle's steering column hub mounting and steering box, and an outer non-rotatable partially-corrugated tube surrounding but rotatably separate from the torque-transmitting assembly, wherein the torque-transmitting assembly consists of or includes a corrugated tube designed to begin to collapse, on collision of the vehicle with another object, before the outer corrugated tube, the outer corrugated tube being designed to collapse at a predetermined rate and absorb substantially all of the collision impact energy.

8 Claims, 3 Drawing Figures

PATENTED JUL 18 1972　　3,677,106

Inventor
JAMES HENRY WESTON

By [signature]
Attorney

STEERING COLUMNS

BACKGROUND OF THE INVENTION

1. Field of the Invention

This invention relates to collapsible energy-absorbing steering columns for motor vehicles.

2. Description of the Prior Art

Collapsible energy-absorbing steering columns are utilized in motor vehicles in order to minimize the amount of injury to the driver's chest during collision of the motor vehicle with another object. These steering columns are such that they progressively collapse under the impact of the collision.

One known form of collapsible energy-absorbing steering column comprises an outer energy-absorbing jacket, a partially convoluted tube, and an inner torque-transmitting assembly. This inner assembly comprises a steel tube and a solid spindle, the spindle being connected to the steering wheel hub mounting, and the steel tube being sleeved over the lower end of the solid spindle and connected to the steering box. The outer jacket tube is separate from the inner assembly and non-rotatable. Unintentional telescoping of the inner assembly is prevented by nylon inserts that connect the spindle to the inner tube. The whole assembly is attached to the motor vehicle's instrument panel by a one-way break-away bracket welded to a plane portion of the outer tube. In a collision where the driver's body exerts a force on the steering wheel in excess of a designed collapse load, the bracket breaks away from the instrument panel, the inner spindle telescopes into the inner tube and, at a predetermined rate, the outer tube collapses like an accordion and absorbs much of the impact energy.

In an alternative form of collapsible energy-absorbing steering column, the inner assembly comprises a solid spindle connected at one end to the steering box, and an inner tube, sleeved over the other end of the solid spindle, connected to the steering column hub mounting. The inner tube may be connected to the spindle by a pin which shears on collision, thus permitting the inner assembly to telescope.

SUMMARY OF THE INVENTION

It is an object of the present invention to provide alternative forms of collapsible energy-absorbing steering columns.

According to the present invention there is provided a collapsible energy-absorbing steering column for a motor vehicle including a torque-transmitting assembly, connected between the vehicle's steering column hub mounting and steering box, and an outer non-rotatable partially-corrugated tube surrounding but rotatably separate from the torque-transmitting assembly, wherein the torque-transmitting assembly consists of or includes a corrugated tube designed to begin to collapse, on collision of the vehicle with another object, before the outer corrugated tube, the outer corrugated tube being designed to collapse at a predetermined rate and absorb substantially all of the collision impact energy.

Preferably the outer convoluted tube is provided with transverse corrugations, and the inner tube is helically corrugated.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
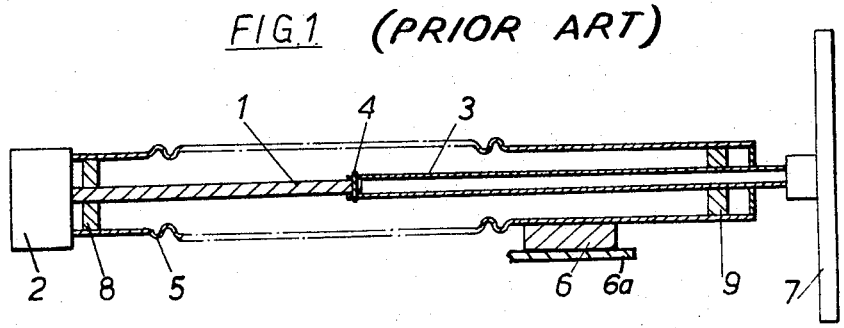
FIG. 1 illustrates schematically a section through a known form of collapsible energy-absorbing steering column.

As previously described, one known form of collapsible energy-absorbing steering column comprises an inner torque-transmitting assembly having a solid spindle and an inner tube. In FIG. 1, this known form of steering column is shown to comprise a solid spindle 1 connected to a steering box assembly 2, an inner tube 3 attached to the solid spindle 1 by a shearable pin 4. This inner assembly is contained within a partially corrugated tube 5, and a bracket assembly 6 connected to the tube 5 is mounted on the instrument panel 6a of the vehicle. The free end of the tube 3 is connected to the steering wheel 7 and the inner assembly is separated from the outer tube 6 by a bushing 8 and bearing 9 such that the outer tube 5 is separated from the inner assembly and does not rotate with it.

On a collision, the bracket 6 breaks away from the instrument panel, the pin 4 shears and tube 3 slides over the spindle 1, thus permitting collapse of the outer tube 5 which occurs at a predetermined rate.

Figure 2:
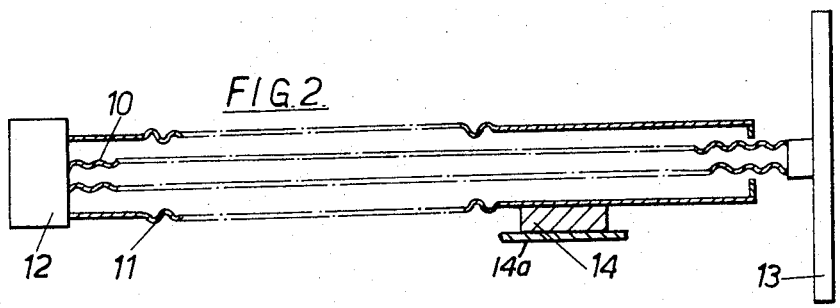
FIG. 2 illustrates schematically a section through a collapsible energy-absorbing steering column according to a first embodiment of the present invention.

According to the embodiment of the invention shown in FIG. 2, the inner torque-transmitting assembly comprises a helically corrugated tube 10, designed to collapse in a regular manner before the collapse of an outer corrugated tube 11 but capable of withstanding the torsional stress occurring during steering. The tube 10 is connected at one end to a steering box assembly 12, and at the other end to the steering wheel 13. A bracket assembly 14 connected to the outer tube 11 is mounted on the instrument panel 14a of the vehicle, the outer tube 11 being separated from the inner tube 10 by means not shown. On a collision, the bracket 14 breaks away from the instrument panel and the inner tube starts to collapse, thus permitting collapse of the outer tube 11 at a predetermined rate.

Figure 3:
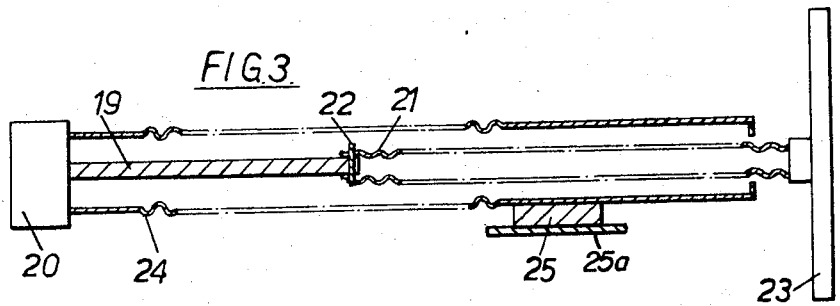
FIG. 3 illustrates schematically a section through a collapsible energy-absorbing steering column according to a second embodiment of the present invention.

According to the embodiment shown in FIG. 3, the inner torque-transmitting assembly comprises a solid spindle 19 connected to a steering box 20, and a helically corrugated tube 21 connected to the spindle 19 by a pin 22 which shears on collision. The tube 21 is connected to the steering wheel 23. A bracket assembly 25 connected to the outer non-rotatable convoluted tube 24 is mounted on the instrument panel 25a of the vehicle. On a collision, the pin 22 shears thus permitting tube 21 to slide over spindle 19 and collapse like an accordion with the spindle 19 acting as a center, and permitting tube 24 to collapse at a predetermined rate.

The outer tubes 11 and 24 may be in accordance with the method disclosed in our copending application, Ser. No. 57,652 filed on July 23, 1970, while the inner helically corrugated tubes 10 and 21 may be made in accordance with any known method. The inner helically corrugated tubes 10 and 21 may be of aluminum while the outer tubes 11 and 24 may be of steel. The outer tubes 11 and 24 are provided with individual transverse corrugations and are such that, for example, they collapse on the application of continuous loads of 1,200 pounds at a rate of 4 inches per minute. In alternative embodiments the inner tubes 10 and 21 may be transversely corrugated.

While I have described above the principles of my invention in connection with specific apparatus it is to be clearly understood that this description is made only by way of example and not as a limitation to the scope of my invention as set forth in the accompanying claims.

I claim:

1. A collapsible energy absorbing steering column for a motor vehicle comprising:
   a vehicle steering wheel hub;
   a steering box;
   a torque-transmitting assembly connecting said hub to said steering box, said assembly including a tube continuously corrugated from said hub to said steering box; and
   an outer non-rotatable partially corrugated tube surrounding but rotatably separate from said continuously corrugated tube, said partially corrugated tube extending from said steering box to a point immediately adjacent said hub to substantially enclose said continuously corrugated tube;
   said continuously corrugated tube being designed to begin to collapse, upon collision of the vehicle with another object, before said partially corrugated tube; and said partially corrugated tube being designed to collapse at a predetermined rate to absorb substantially all of the collision impact energy.

2. A steering column according to claim 1, wherein said continuously corrugated tube is helically corrugated.

3. A steering column according to claim 1, wherein said continuously corrugated tube is transversely corrugated.

4. A steering column according to claim 1, wherein said continuously corrugated tube is made of aluminum, and said partially corrugated tube is made of steel.

5. A steering column according to claim 1, further including a vehicle instrument panel, and
a bracket connecting said partially corrugated tube to said instrument panel,
said bracket breaking away from said instrument panel upon said collision to enable said continuously corrugated tube to begin to collapse and said partially corrugated tube to collapse at said predetermined rate.

6. A steering column according to claim 5, wherein said continuously corrugated tube is helically corrugated.

7. A steering column according to claim 5, wherein said continuously corrugated tube is transversely corrugated.

8. A steering column according to claim 5, wherein said continuously corrugated tube is made of aluminum, and said partially corrugated tube is made of steel.

* * * * *